United States Patent
Ashino

(10) Patent No.: US 8,683,867 B2
(45) Date of Patent: Apr. 1, 2014

(54) PRESSURE SENSOR PACKAGE HAVING A GROOVE PROVIDED IN A WALL SURFACE OF THE PRESSURE INLET PIPE

(75) Inventor: Kimihiro Ashino, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 235 days.

(21) Appl. No.: 13/243,176

(22) Filed: Sep. 23, 2011

(65) Prior Publication Data

US 2012/0073381 A1 Mar. 29, 2012

(30) Foreign Application Priority Data

Sep. 28, 2010 (JP) ................. 2010-216968

(51) Int. Cl.
*G01L 7/00* (2006.01)
*G01L 9/00* (2006.01)

(52) U.S. Cl.
USPC ............................................. 73/753; 73/700

(58) Field of Classification Search
None
See application file for complete search history.

(56) References Cited

U.S. PATENT DOCUMENTS

| | | | | |
|---|---|---|---|---|
| 5,060,108 A | * | 10/1991 | Baker et al. ................. | 361/283.4 |
| 5,834,652 A | * | 11/1998 | Koshimizu ...................... | 73/756 |
| 5,932,809 A | * | 8/1999 | Sparks et al. ................... | 73/727 |
| 6,550,338 B1 | * | 4/2003 | Rashidi ............................ | 73/715 |
| 6,606,912 B2 | * | 8/2003 | Ohmi et al. ..................... | 73/756 |
| 6,813,952 B2 | * | 11/2004 | Yamashita et al. .............. | 73/708 |
| 8,051,719 B2 | * | 11/2011 | Bigliati et al. .................. | 73/756 |
| 8,408,067 B2 | * | 4/2013 | Zorzetto et al. ................. | 73/756 |
| 8,468,893 B2 | * | 6/2013 | Fujiwara et al. ................ | 73/700 |
| 2008/0110273 A1 | | 5/2008 | Saito et al. | |

FOREIGN PATENT DOCUMENTS

| | | |
|---|---|---|
| JP | 2001-153748 A | 6/2001 |
| JP | 2004-279091 A | 10/2004 |
| JP | 2008-122182 A | 5/2008 |
| JP | 2009-052728 A | 3/2009 |

OTHER PUBLICATIONS

JP OA issued Jun. 18, 2013 for corres. JP 2010-216968 (Partial Translation provided).

* cited by examiner

*Primary Examiner* — Lisa Caputo
*Assistant Examiner* — Jermaine Jenkins
(74) *Attorney, Agent, or Firm* — Rossi, Kimms & McDowell LLP

(57) ABSTRACT

An aspect of a pressure sensor package is that a condensed droplet can be prevented from solidifying and blocking the hole of a pressure inlet pipe, without increasing the external dimensions of the package. Aspects of the invention include a groove in a wall surface of a hole of a pressure inlet pipe, a droplet condensed on the wall surface spreads along the groove by a capillary action, and it is possible to prevent the hole of the pressure inlet pipe being blocked by the droplet.

5 Claims, 16 Drawing Sheets

PRESSURE SENSOR PACKAGE HAVING A GROOVE PROVIDED IN A WALL SURFACE OF THE PRESSURE INLET PIPE

BACKGROUND OF THE INVENTION

1. Technical Field

The present invention relates to a pressure sensor package having a pressure inlet pipe, and in particular, relates to a pressure sensor package that can prevent a blocking of a hole of the pressure inlet pipe due to the condensation of a pressure medium.

2. Related Art

Pressure sensors are widely used in automobiles, and are used in conditions of severe heat and cold. For example, they may be installed in an engine compartment, used as a manifold pressure sensor, or installed as an exhaust gas filter clogging sensor. In this way, they are used where there is a considerable change in the temperature of a measurement medium (air or exhaust gas) itself, or in the temperature of a product in an environment in which the sensor is installed.

FIGS. 15A and 15B are configuration diagrams of a pressure sensor package, wherein FIG. 15A is a main portion plan view, and FIG. 15B is a main portion sectional view cut along an X-X line of FIG. 15A.

FIGS. 16A and 16B are configuration diagrams of a pressure inlet pipe, wherein FIG. 16A is a main portion side sectional view of a B portion of FIG. 15B, and FIG. 16B is a main portion plan view cut along an X-X line of FIG. 16A.

A pressure sensor package 500 is formed of a case 51, a cover 52, and a pressure inlet pipe 53. A pressure sensor chip 61 and an external lead terminal 62 connected to the chip 61 are housed in the case 51. The whole is a heretofore known pressure sensor.

A hole 54 of the pressure inlet pipe 53 reaches the pressure sensor chip 61, and the pressure of a pressure medium (air or the like) introduced into the hole 54 of the pressure inlet pipe 53 is detected and measured by the pressure sensor chip 61.

A description will be given of a method of processing the hole 54 of the pressure inlet pipe 53. For example, when the pressure inlet pipe 53 is metallic, there is a grinding processing, an extrusion processing, a drawing processing, a casting, a pressing, and the like. Also, when the pressure inlet pipe 53 is of a resin, it is processed by a resin molding. The hole 54 of the pressure inlet pipe 53 is circular, and the machined surface of the hole 54 is finished comparatively smoothly to a roughness in the order of a few micrometers.

In JP-A-2008-122182, a description is given of a pressure sensor device, or more specifically of a pressure sensor container of the device, including a pressure detection chamber into which a gas whose pressure is to be measured is introduced, a pressure sensor element that detects the pressure of the gas, and a protective wall that prevents a foreign object from entering the pressure detection chamber.

The protective wall includes an inclined surface, and the inclined surface is given an angle θ8 a such that, when the pressure sensor device is disposed inclined at a first angle θ1 with respect to the horizontal, a second angle θ2 is held facing downward between the inclined surface and the horizontal.

Also, it is described that, by forming a separate inclined surface as necessary in the inner peripheral wall of the pressure detection chamber, it is possible, even when the pressure sensor device is disposed inclined due to a layout, or the like, to provide a pressure sensor device and pressure sensor container with which it is possible to prevent a freezing of moisture, a swelling of a gel-form coating member, and pressure sensor element damage, without allowing moisture, oil, gasoline, or the like, to accumulate on the protective wall.

With the heretofore known pressure inlet pipe 53, when the introduced pressure medium, such as air, reaches a low temperature, it may happen that condensation forms on a wall surface 55 of the hole 54 of the pressure inlet pipe 53.

FIGS. 17A and 17B and FIGS. 18A and 18B are diagrams showing a condensation condition, wherein FIGS. 17A and 17B are diagrams showing an initial condition, and FIGS. 18A and 18B are diagrams showing a late stage condensation condition. In the drawings, FIGS. 17A and 18A are side sectional views, and FIGS. 17B and 18B are main portion plan views cut along an X-X line of FIGS. 17A and 18A respectively.

As the pressure medium, there is air, a vapor of gasoline or oil, a combustible gas, or the like. Also, the pressure medium condensed and forming a spherical liquid is called a droplet 63a.

As shown in FIG. 17A, the pressure medium condenses, becoming the droplet 63, and the droplet 63 becomes spherical due to surface tension and leakage. Next, as shown in FIG. 18B, when growth of the condensed droplet 63 advances further due to condensation, the droplet 63 blocks the hole 54 of the pressure inlet pipe 53. However, as the droplet 63 moves under the pressure of the pressure medium in this condition, there is no impediment to the detection and measurement of the pressure of the pressure medium.

However, when the condensed droplet 63 is exposed to low temperature and solidifies, the droplet 63 blocking the hole 54 of the pressure inlet pipe 53 solidifies, and becomes a solid (for example, it freezes). As a result of this, as the hole 54 of the pressure inlet pipe 53 is completely blocked by the solid, and the solid does not move under the pressure of the pressure medium, it is not possible to communicate the pressure of the pressure medium to the pressure sensor chip 61. Because of this, for example, it is not possible to operate an automobile engine system normally.

In order to prevent the hole 54 of the pressure inlet pipe 53 from being blocked as heretofore described, there is a method whereby the diameter of the hole 54 is increased, but when increasing the size of the hole 54, the external form of the pressure sensor package 500 increases in size, and the manufacturing cost also increases.

Also, in JP-A-2008-122182, there is no description of a formation of a groove in the wall surface of the hole of the pressure inlet pipe in order to prevent the pressure inlet pipe being completely blocked by the pressure medium condensing and the droplet solidifying.

SUMMARY OF THE INVENTION

An object of the invention, in order to solve the heretofore described problem, is to provide a pressure sensor package with which it is possible to prevent a condensed droplet solidifying and blocking the hole of a pressure inlet pipe, without increasing the external dimensions of the package.

In order to achieve the object, according to a first aspect of the invention, a pressure sensor package includes a case for housing a pressure sensor chip, a cover disposed on the case, and a pressure inlet pipe for transmitting the pressure of a pressure medium to the pressure sensor chip, wherein a groove is provided in a wall surface of a hole of the pressure inlet pipe.

Also, according to a second aspect of the invention, it is preferable in the pressure sensor package according to the first aspect that the groove is provided from an entrance of the pressure inlet pipe from which the pressure medium is introduced to a location in which it reaches the vicinity of the pressure sensor chip.

Also, according to a third aspect of the invention, it is preferable in the pressure sensor package according to the first aspect that the groove is provided parallel to the longitudinal direction of the pressure inlet pipe.

Also, according to a fourth aspect of the invention, it is preferable in the pressure sensor package according to the first aspect that the sectional form of the groove is a U-shaped type.

Also, a fifth aspect of the invention is a pressure sensor wherein the pressure sensor chip is housed in the pressure sensor package according to the first aspect.

According to the invention, by forming a groove in the wall surface of the hole of the pressure inlet pipe, the droplet condensed on the wall surface spreads along the groove by a capillary action, and it is possible to prevent the hole of the pressure inlet pipe being blocked by the droplet.

As a result of this, even when the temperature is low and the droplet solidifies, it does not happen that the hole of the pressure inlet pipe is blocked by the solidified droplet, and it is possible to reliably transmit the pressure of the pressure medium to the pressure sensor chip.

Also, as there is no need to increase the size of the hole of the pressure inlet pipe, the size of the external form of the pressure sensor package does not increase, and there is no increase in manufacturing cost.

BRIEF DESCRIPTION OF THE DRAWINGS

FIGS. 1A to 1D are configuration diagrams of a pressure sensor package of a first embodiment of the invention, wherein FIG. 1A is a main portion plan view, FIG. 1B is a main portion side sectional view cut along an X-X line of FIG. 1A, and FIGS. 1C and 1D are main portion sectional views of a pressure sensor cell;

FIGS. 2A and 2B are configuration diagrams of a pressure inlet pipe, wherein FIG. 2A is a main portion side sectional view, and FIG. 2B is a main portion plan view cut along an X-X line of FIG. 2A;

FIGS. 3A to 3C are diagrams showing groove sectional forms, wherein FIG. 3A is a diagram in the case of a U-shaped type, FIG. 3B is a diagram in the case of a V-shaped type, and FIG. 3C is a case of a triangular wave type;

FIGS. 4A and 4B are diagrams showing an initial condition of a droplet 13 caused by a pressure medium condensing, wherein FIG. 4A is a side sectional view, and FIG. 4B is a plan view cut along an X-X line of FIG. 4A;

FIGS. 5A and 5B are diagrams showing a condition of the droplet 13 being induced to flow along the groove 6 and growing, wherein FIG. 5A is a side sectional view, and FIG. 5B is a plan view cut along an X-X line of FIG. 5A;

FIGS. 12A and 12B, continuing from FIG. 11, are main portion manufacturing step sectional views of the pressure sensor package of FIGS. 1A to 1D, wherein FIG. 12A is a sectional view, and FIG. 12B is a perspective view of a B portion of FIG. 12A;

FIGS. 13A and 13B are main portion configuration diagrams of a pressure sensor package of a second embodiment of the invention, wherein FIG. 13A is a main portion side sectional view, and FIG. 13B is a main portion plan view cut along an X-X line of FIG. 13A;

FIGS. 14A and 14B are main portion configuration diagrams of a pressure sensor package of a third embodiment of the invention, wherein FIG. 14A is a main portion side sectional view, and FIG. 14B is a main portion plan view cut along an X-X line of FIG. 14A;

FIGS. 15A and 15B are configuration diagrams of a pressure sensor package, wherein FIG. 15A is a main portion plan view, and FIG. 15B is a main portion side sectional view cut along an X-X line of FIG. 15A;

FIGS. 16A and 16B are configuration diagrams of a pressure inlet pipe, wherein FIG. 16A is a main portion side sectional view of a B portion of FIG. 15B, and FIG. 16B is a main portion plan view cut along an X-X line of FIG. 16A;

FIGS. 17A and 17B are diagrams showing an initial condensation condition, wherein FIG. 17A is a side sectional view, and FIG. 17B is a main portion plan view cut along an X-X line of FIG. 17A; and FIGS. 18A and 18B are diagrams showing a late stage condensation condition, wherein FIG. 18A is a side sectional view, and FIG. 18B is a main portion plan view cut along an X-X line of FIG. 18A.

DETAILED DESCRIPTION OF THE EMBODIMENTS

An embodiment will be described using the following embodiments.

Embodiment 1

Figure 1A:
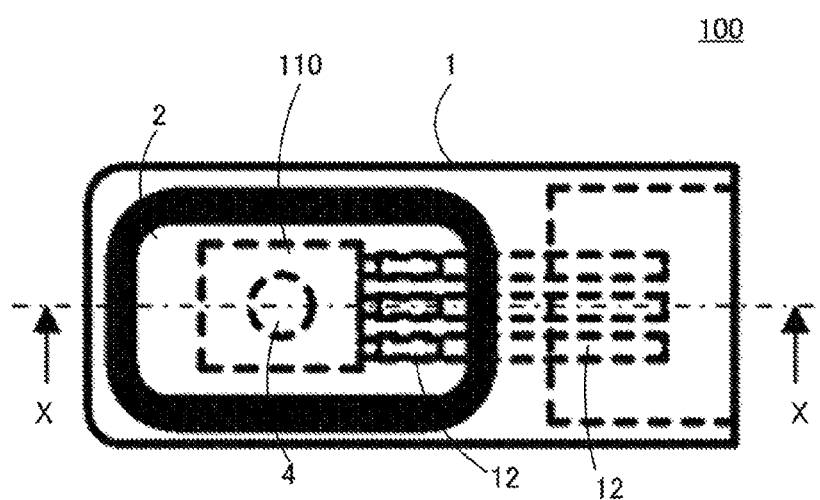
Figure 1B:
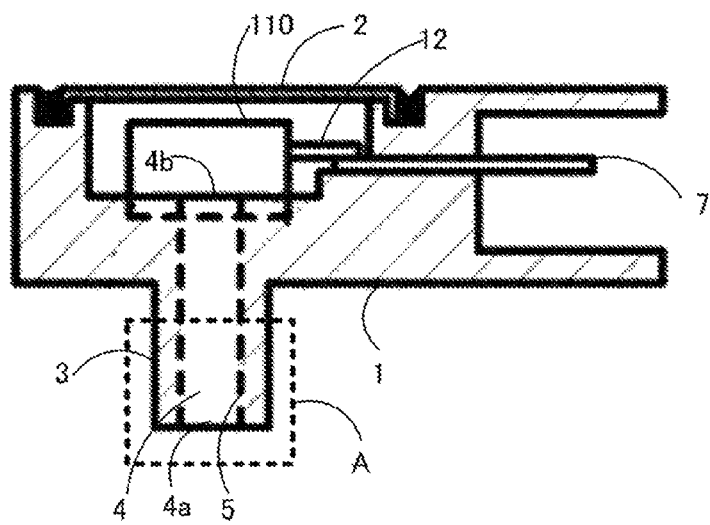
Figure 1C:
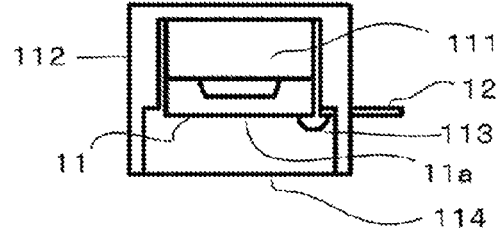
Figure 1D:
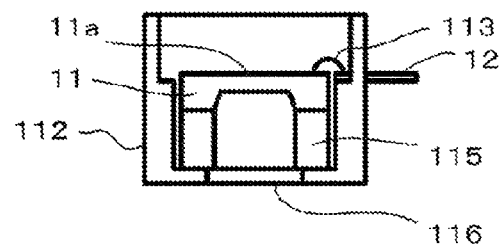

FIGS. 1A to 1D are configuration diagrams of a pressure sensor package of a first embodiment of the invention, wherein FIG. 1A is a main portion plan view, FIG. 1B is a main portion sectional view cut along an X-X line of FIG. 1A, and FIGS. 1C and 1D are main portion sectional views of a pressure sensor cell 110 shown in FIGS. 1A and 1B.

The pressure sensor package 100 is configured of a case 1, made from resin, with which an external lead terminal 7 is integrally molded, a cover 2, and a pressure inlet pipe 3. The pressure sensor cell 110, including a pressure sensor chip 11 and an external inlet terminal 12 connected thereto, is housed inside the case 1. The configuration illustrated in FIG. 1C or FIG. 1D, or the like, is conceivable as the pressure sensor cell 110. FIG. 1C is an example of an absolute pressure sensor, wherein the pressure sensor chip 11 including a diaphragm 11a connected to a base 111 made of glass or the like is fixed inside a resin case 112 with which the lead terminal 12 is integrally molded, and the pressure sensor chip 11 and lead terminal 12 are connected with a bonding wire 113. Reference numeral 114 is an aperture portion, which is fixed in the case 1 so as to oppose the pressure inlet pipe 3. FIG. 1D is an example of a relative pressure sensor, wherein the pressure sensor chip 11 including the diaphragm 11a connected to a base 115 including an aperture portion 116 is fixed inside the resin case 112 with which the lead terminal 12 is integrally molded, and the pressure sensor chip 11 and lead terminal 12 are connected with the bonding wire 113. Reference numeral 116 is an aperture portion, which is fixed in the case 1 so as to oppose the pressure inlet pipe 3. Also, a configuration formed from only the base 115 and pressure sensor chip 11 shown in FIG. 1D may also be adopted as the pressure sensor cell 110. In this case, it is sufficient to connect the pressure sensor chip 11 and external lead terminal 7 directly.

A pressure medium is introduced from the pressure inlet pipe 3, and the pressure of the pressure medium is transmitted to the pressure sensor chip 11 via the pressure inlet pipe 3.

Figure 2:
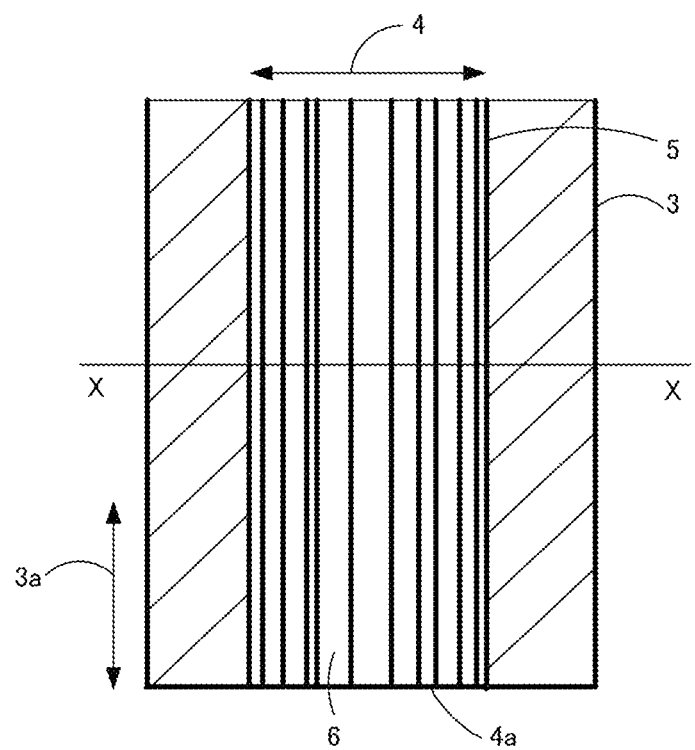
Figure 2:
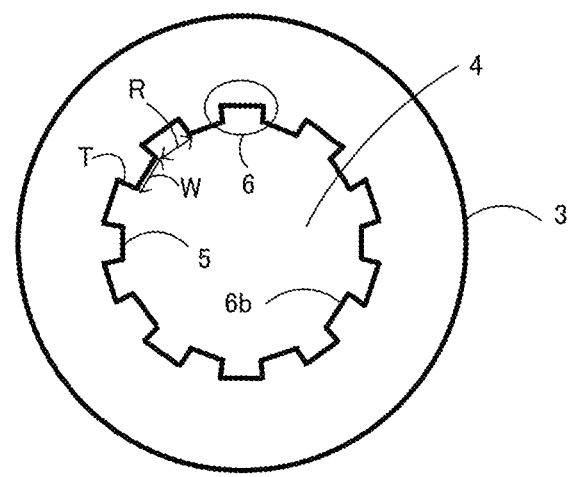

FIGS. 2A and 2B are configuration diagrams of the pressure inlet pipe, wherein FIG. 2A is a main portion side sectional view, and FIG. 2B is a main portion plan view cut along an X-X line of FIG. 2A. The inner diameter of the pressure inlet pipe 3 (the diameter of a hole 4) is in the order of, for example, 2 mm to 5 mm. Herein, the inner diameter refers to the diameter at a protruding portion surface 6b of a groove 6. The groove 6 is formed in a longitudinal direction 3a of the pressure inlet pipe 3.

Figure 3:
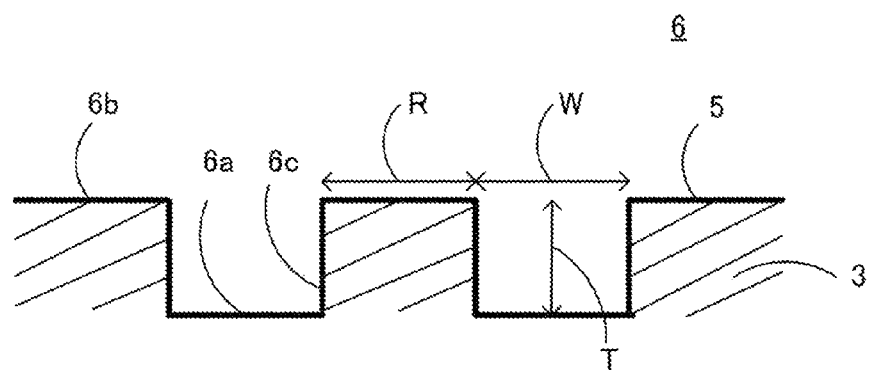
Figure 3:
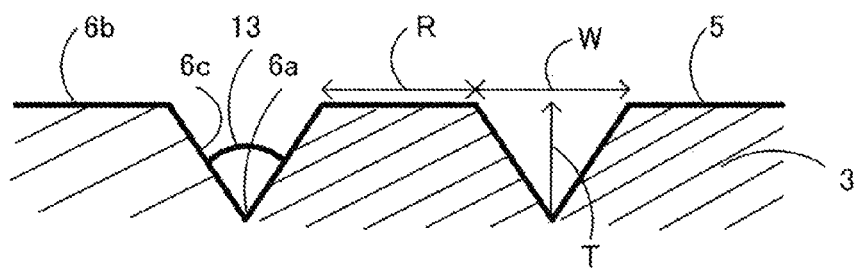
Figure 3:
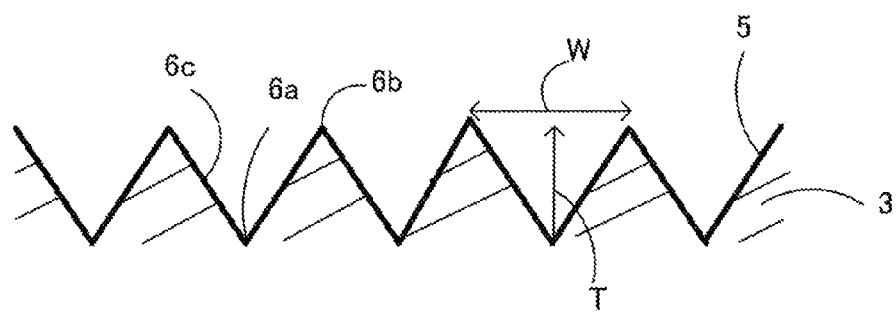

FIGS. 3A to 3C are diagrams showing groove sectional forms, wherein FIG. 3A is a diagram in the case of a U-shaped type, FIG. 3B is a diagram in the case of a V-shaped type, and FIG. 3C is a case of a triangular wave type. These grooves 6 are formed in a wall surface 5 of the hole 4 of the pressure inlet pipe 3, and a formation range of the grooves 6 is from an entrance 4a of the hole 4 of the pressure inlet pipe 3 to an end 4b on the opposite side (in the vicinity of the pressure sensor chip). Next, a description will be given of dimensions of the groove 6.

A width W of the groove is in the order of 10 μm to 1 mm, a depth T of the groove is in the order of 10 μm to 1 mm, the same as the width W of the groove, and an interval R between grooves is in the order of 10 μm to 1 mm, the same as the width W of the groove. However, there is no interval R in the case of FIG. 3C, and the sectional form thereof is a continuous V-shaped type.

The dimensions of the groove 6 depend on the leakage of a droplet 13 from the wall surface 5, the surface tension of the droplet 13, and the viscosity of the droplet 13. For this reason, an optimum value may be decided upon within the previously mentioned range in accordance with the kind of pressure medium so that the droplet 13 spreads along the groove 6 (so that capillary action occurs).

With the previously described groove forms, the effect of the surface tension increases the more of the droplet 13 attaches to a bottom portion 6a of the groove 6 in FIGS. 3B and 3C. However, as side walls 6c of the groove 6 sandwiching the droplet 13 spread as the droplet 13 grows and increases in size, the surface tension becomes weaker. For this reason, the form of FIG. 3A, wherein the dependence of the surface tension on the size of the droplet 13 is low, is preferable.

By this kind of groove 6 being formed in the wall surface 5 of the hole 4 of the pressure inlet pipe 3, it does not happen that, by the pressure medium condensing and the droplet 13 thereof solidifying at low temperature, the hole 4 of the pressure inlet pipe 3 is blocked by the solidified droplet 13.

Figure 4:
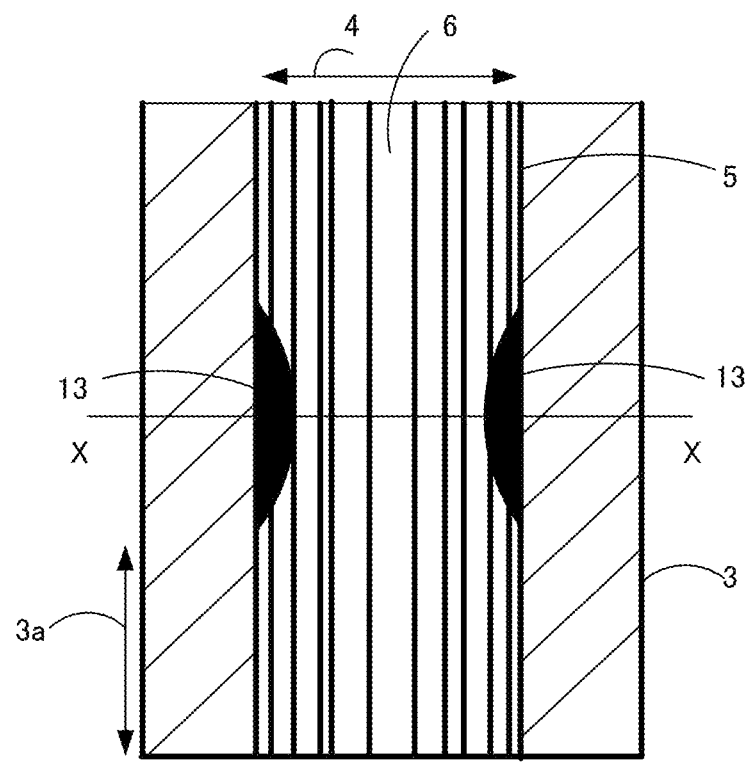
Figure 4:
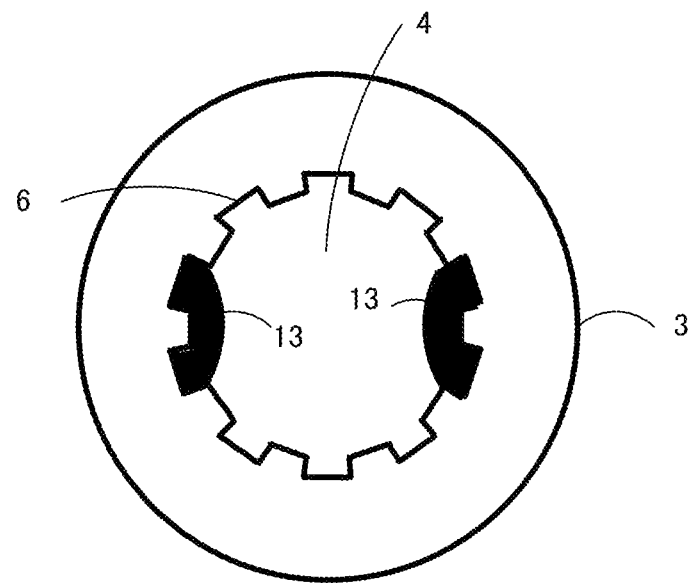
Figure 5:
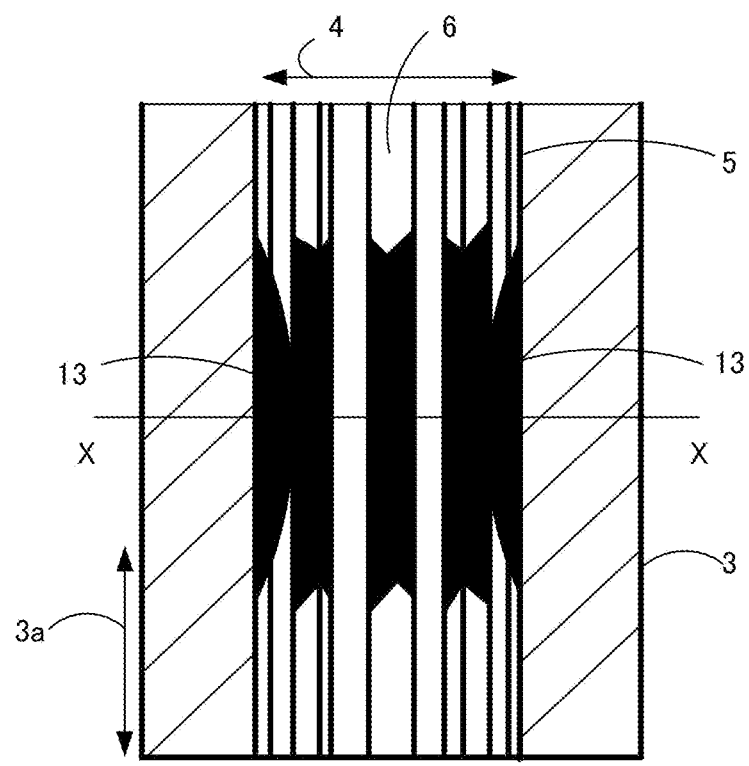
Figure 5:
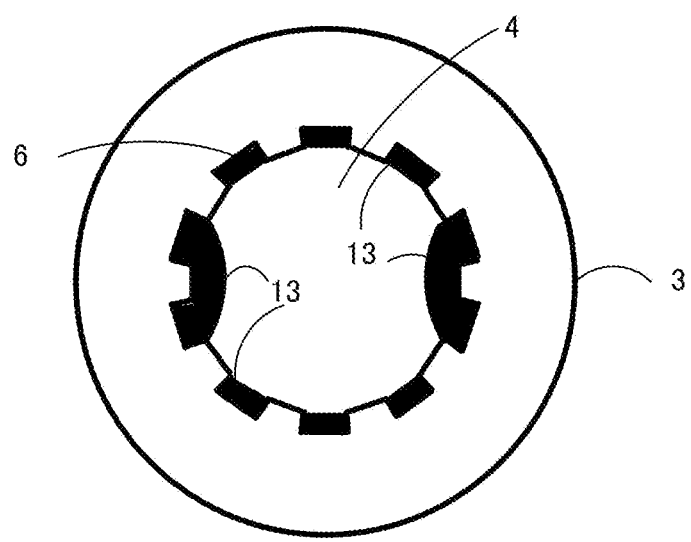
Figure 6:
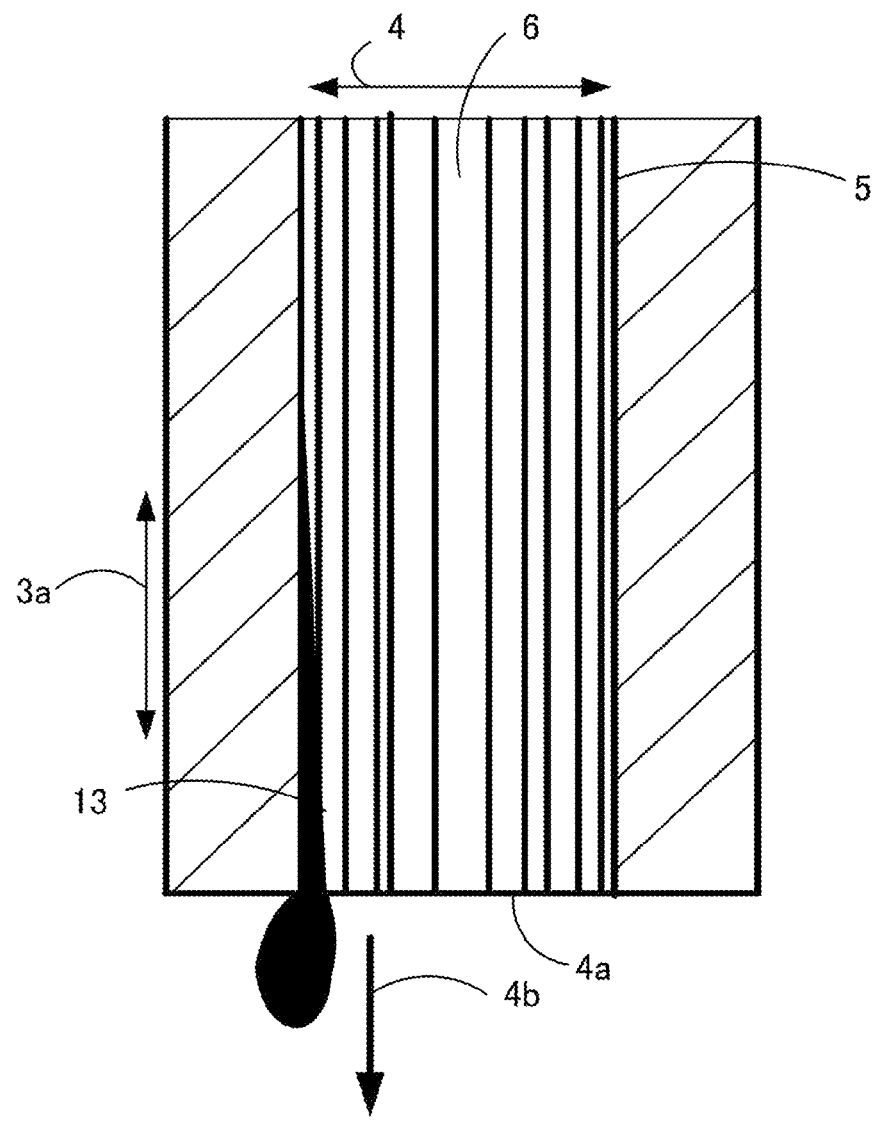
FIG. 6 is a side sectional view showing a condition of the droplet 13 being evacuated from a hole 4 of the pressure inlet pipe 3.
Figure 7:
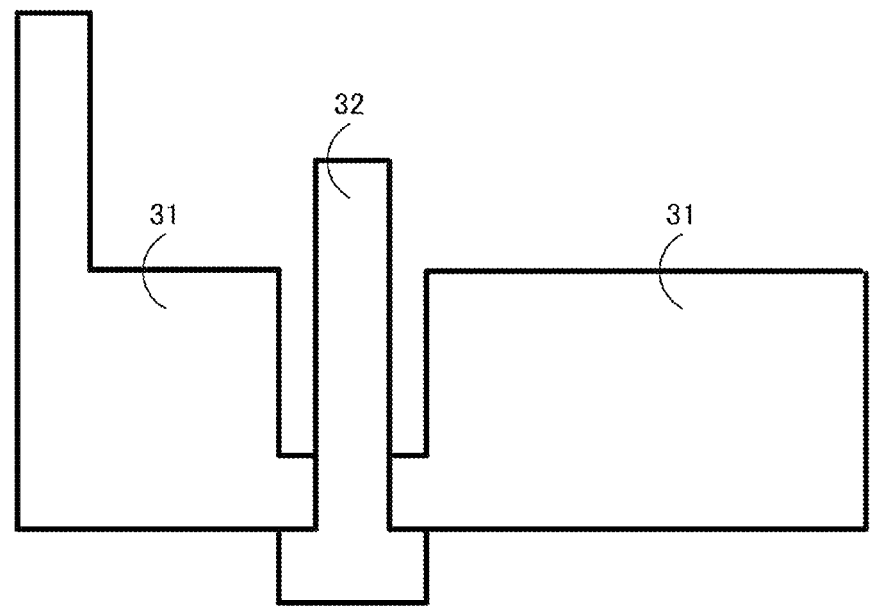
FIGS. 7A and 7B are main portion manufacturing step sectional views of the pressure sensor package of FIGS. 1A to 1D.
Figure 7:
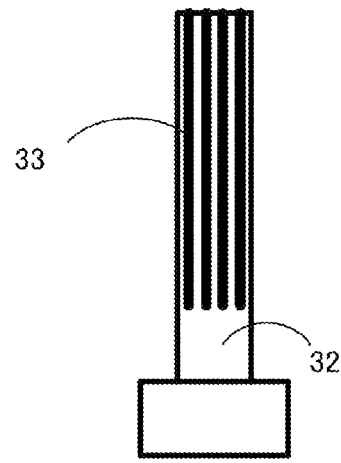

FIGS. 4A to 6 are diagrams showing a droplet evacuation mechanism when the pressure medium condenses. Of the drawings, FIGS. 4A, 5A, and 6 are side sectional views, and FIGS. 4B and 5B are plan views cut along an X-X line of FIGS. 4A and 5A respectively. Herein, a description will be given of the case of the groove form of FIG. 3A.

The droplet 13 (FIGS. 4A and 4B) of the condensation attached to the wall surface 5 of the hole 4 of the pressure inlet pipe 3 is such that, because of the groove 6 provided in the wall surface 5, the force of the capillary action has a greater effect than the surface tension of the droplet 13 and the leakage from the wall surface of the hole 4 of the pressure inlet pipe 3, and the droplet 13 flows in the same direction as the groove 6 (the longitudinal direction of the pressure inlet pipe 3). For this reason, it is not possible for the attached droplet 13 to grow in a direction that blocks the hole 4 of the pressure inlet pipe 3 (a direction perpendicular to the longitudinal direction 3a of the pressure inlet pipe 3), and the droplet 13 is induced to flow along the groove 6 (FIGS. 5A and 5B). The direction in which the pressure sensor chip 11 is installed is such that, by arranging in such a way that the entrance 4a of the hole 4 of the pressure inlet pipe 3 faces in a gravitational force direction 4c (the direction facing the ground), the droplet 13 induced to flow along the groove 6 heads toward the entrance 4a of the hole 4 of the pressure inlet pipe 3, and is evacuated from the hole 4 of the pressure inlet pipe 3 (FIG. 6). Even when a solidification (freezing) temperature is reached in this condition, only the wall surface 5 of the hole 4 of the pressure inlet pipe 3 solidifies (freezes), meaning that there is no impediment to pressure transmission. Also, even when the droplet 13 is not evacuated, as the droplet 13 spreads along the groove 6, it does not happen that the hole 4 of the pressure inlet pipe 3 is blocked by the droplet 13, meaning that, as the hole 4 of the pressure inlet pipe 3 is not blocked even when the droplet 13 solidifies, there is no impediment to pressure transmission.

Herein, a case is shown in which the form of the hole 4 of the pressure inlet pipe 3 is circular, but it may also be a polygonal form such as a quadrilateral form or hexagonal form.

Next, a description will be given of a manufacturing method of the pressure sensor package of FIGS. 1A to 1D. Herein, step sectional views of the pressure sensor package, molding die, and the like, are represented schematically.

FIGS. 7A to 12B are main portion manufacturing step sectional views, shown in step order, of the manufacturing method of the pressure sensor package of FIGS. 1A to 1D. Herein, a case in which the material of the pressure sensor package 100 is resin is given as an example.

Firstly, as shown in FIGS. 7A and 7B, a cylinder 32 in which is formed a groove 33 corresponding to the groove 6 shown in FIG. 3A is set on a lower molding die 31. The grove 6 shown in FIG. 3A is formed in the wall surface 5 of the hole 4 of the pressure inlet pipe 3 by the cylinder 32 with the groove 33.

Figure 8:
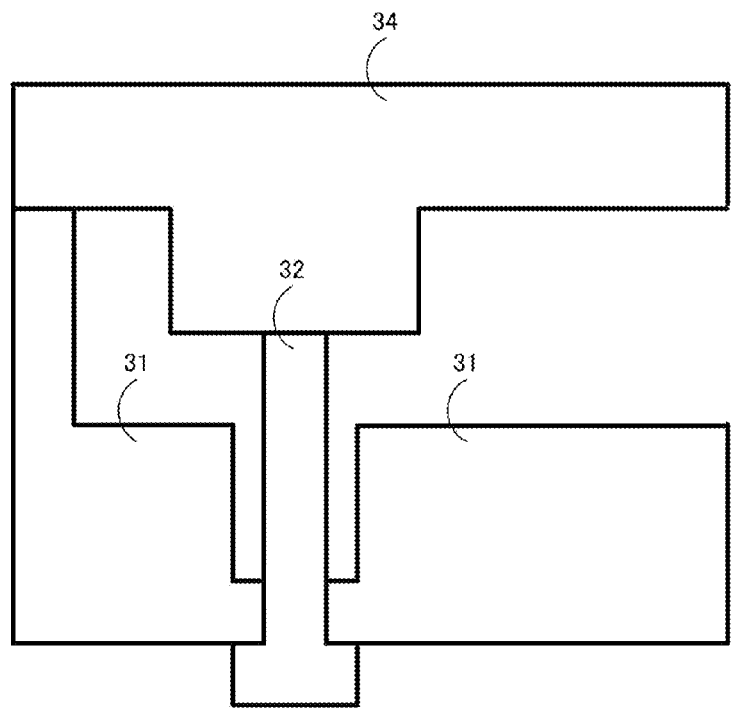
FIG. 8, continuing from FIGS. 7A and 7B, is a main portion manufacturing step sectional view of the pressure sensor package of FIGS. 1A to 1D.

Next, an upper molding die 34 is set on the lower molding die 31, as shown in FIG. 8.

Figure 9:
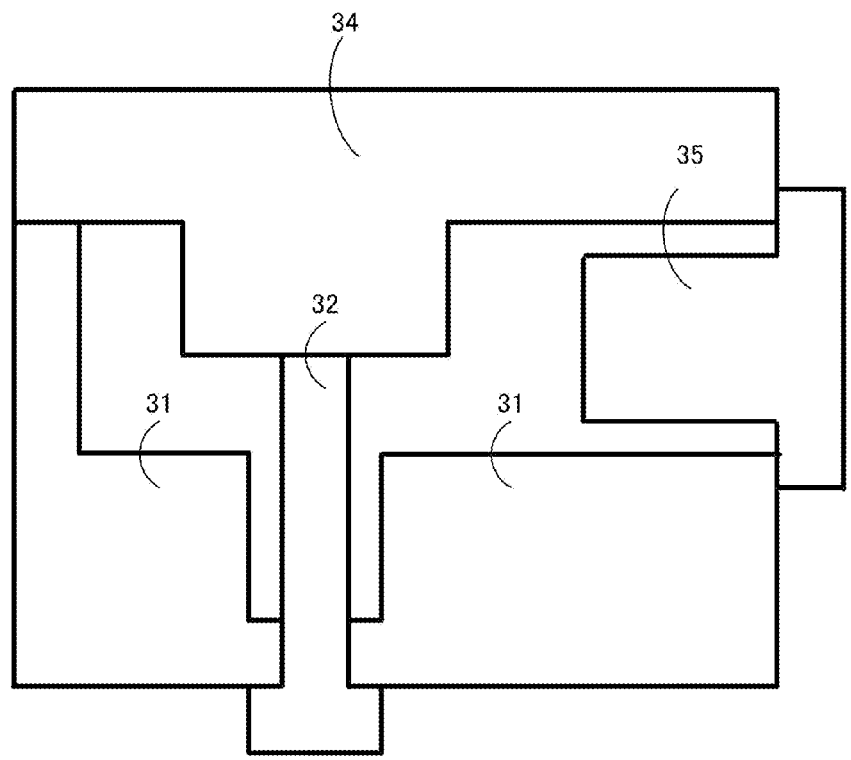
FIG. 9, continuing from FIG. 8, is a main portion manufacturing step sectional view of the pressure sensor package of FIGS. 1A to 1D.

Next, a side surface molding die 35 is set, as shown in FIG. 9

Figure 10:
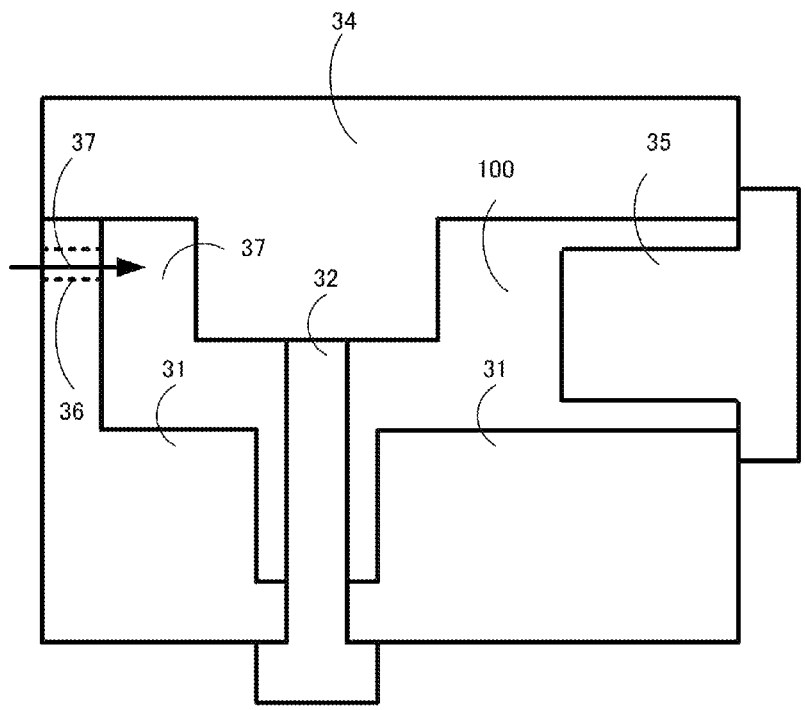
FIG. 10, continuing from FIG. 9, is a main portion manufacturing step sectional view of the pressure sensor package of FIGS. 1A to 1D.

Next, a resin 37 is injected from an injection opening 36 and hardened, as shown in FIG. 10.

Figure 11:
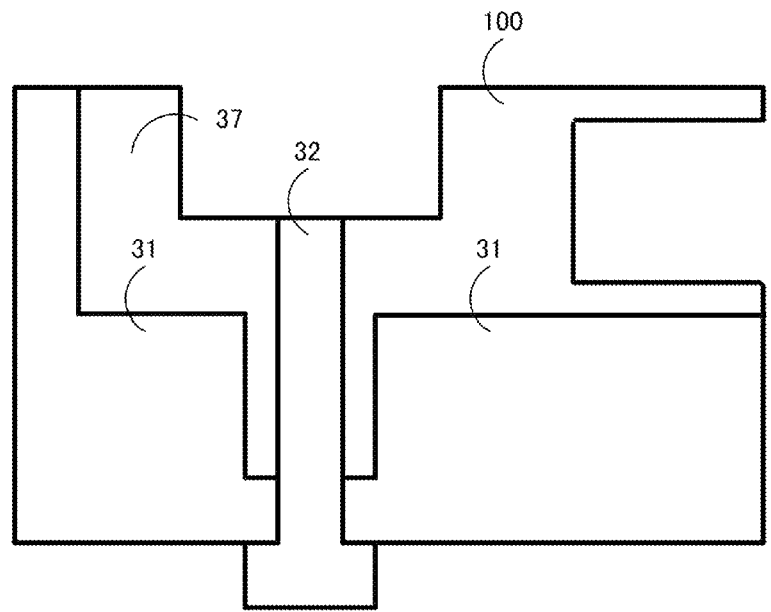
FIG. 11, continuing from FIG. 10, is a main portion manufacturing step sectional view of the pressure sensor package of FIGS. 1A to 1D.
Figure 12:
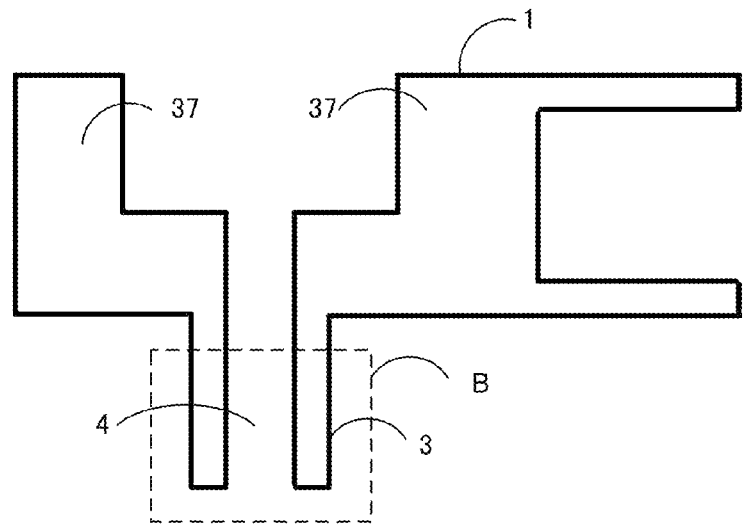
Figure 12:
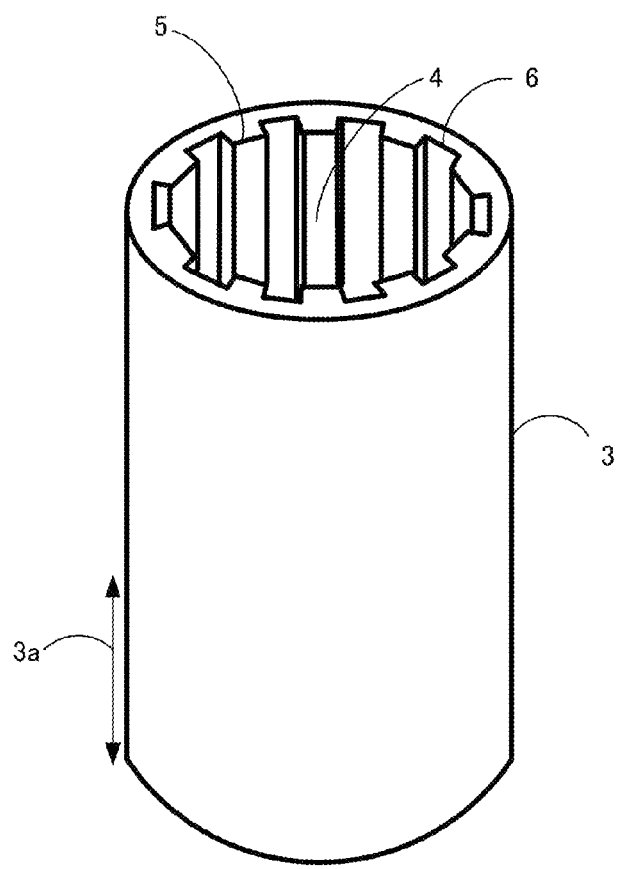

Next, after removing the side surface molding die 35, the upper molding die 34 is removed, as shown in FIG. 11.

Next, after removing the cylinder 32 with the groove, the pressure sensor package 100 molded from resin is removed from the lower die 31, as shown in FIGS. 12A and 12B. When the groove 6 is formed diagonally, the cylinder 32 is removed while being rotated. FIG. 12A is a sectional view of the case 1 of the pressure sensor package 100, and FIG. 12B is a perspective view of a B portion of FIG. 12A.

Herein, a description of the manufacturing method of the cover 2 of the upper portion of the pressure sensor package 100 will be omitted. Also, the pressure sensor chip 11 and lead terminal 12 are installed in the case 1 of the pressure sensor package 100, and the cover 2 placed on, completing the pressure sensor.

Embodiment 2

Figure 13:
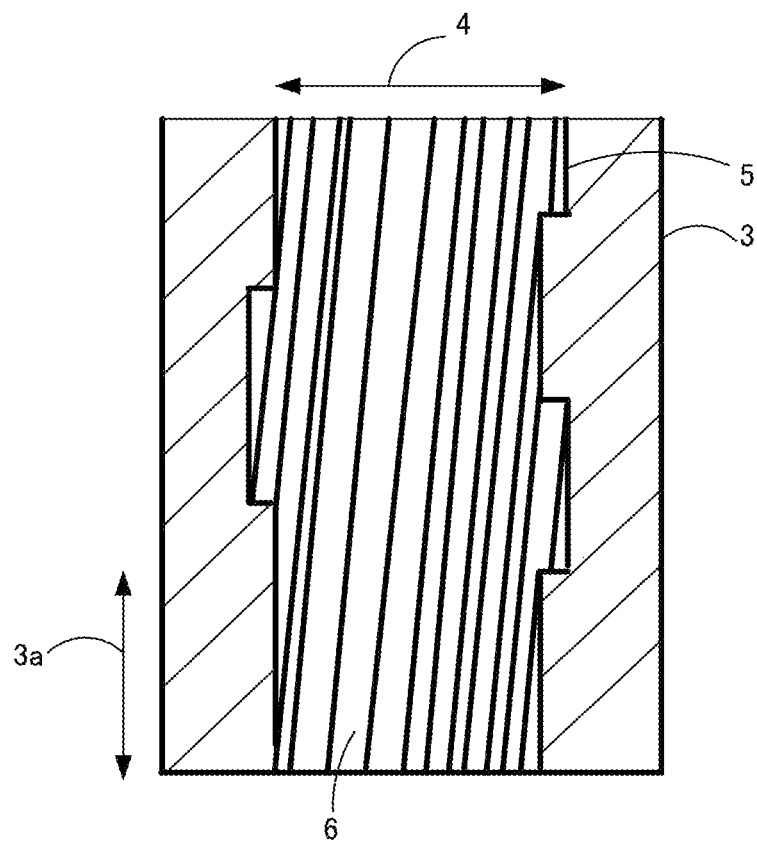
Figure 13:
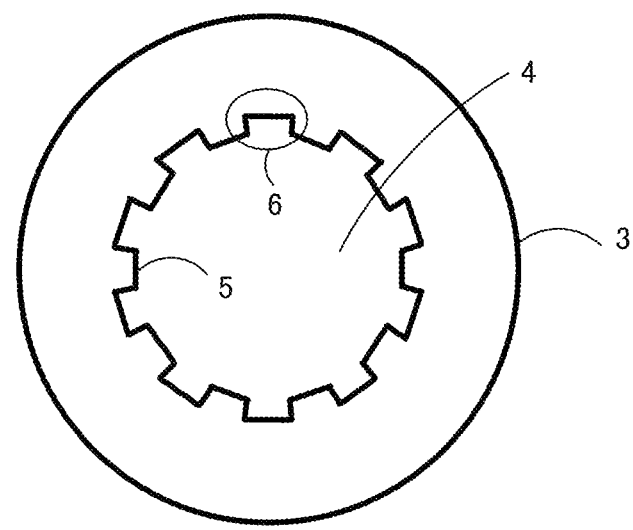

FIGS. 13A and 13B are main portion configuration diagrams of a pressure sensor package of a second embodiment of the invention, wherein FIG. 13A is a main portion side sectional view, and FIG. 13B is a main portion plan view cut along an X-X line of FIG. 13A.

The difference from FIGS. 1A to 1D is in the point that the groove 6 is formed diagonally with respect to the longitudinal direction of the pressure inlet pipe 3. In this case too, there is the same advantage as in FIGS. 1A to 1D. In this case, a molding die wherein the lower molding die 31 shown in FIG. 7A is separated left and right at the location of the groove 33 is used as the molding die for forming the case.

Embodiment 3

Figure 14:
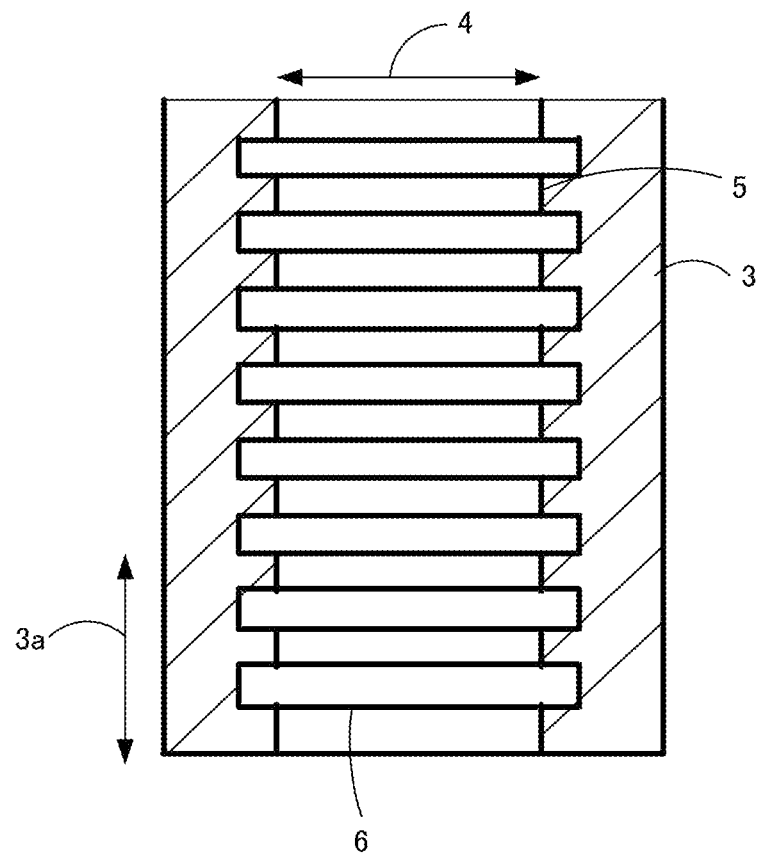
Figure 14:
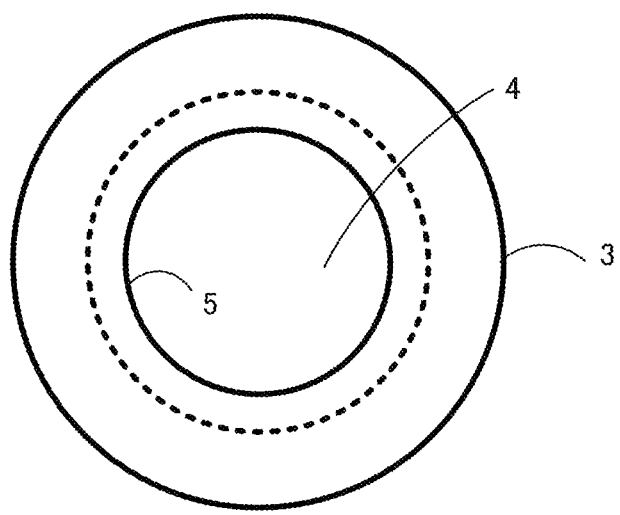
Figure 15:
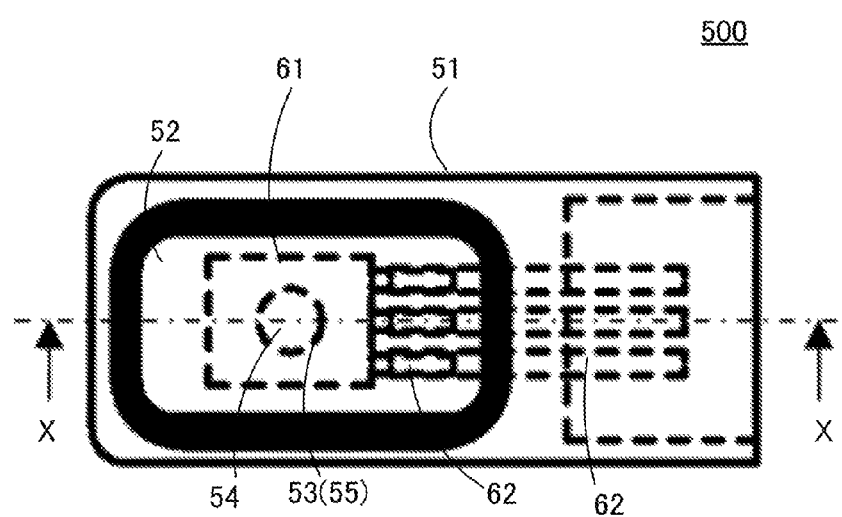
Figure 15:
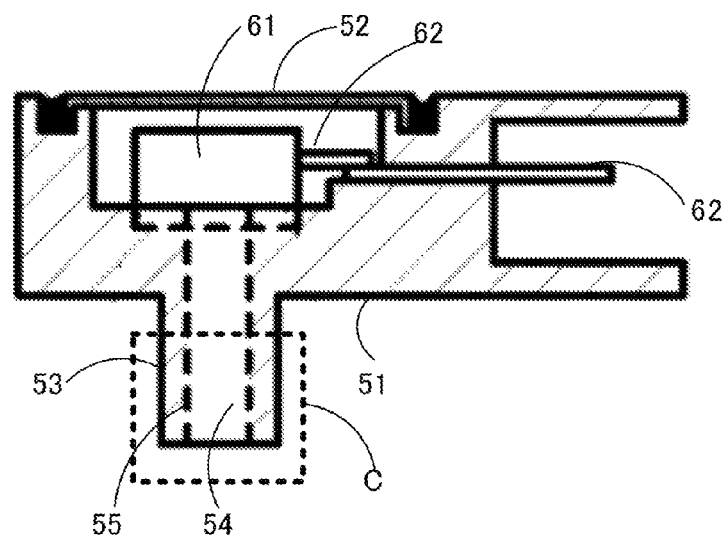
Figure 16:
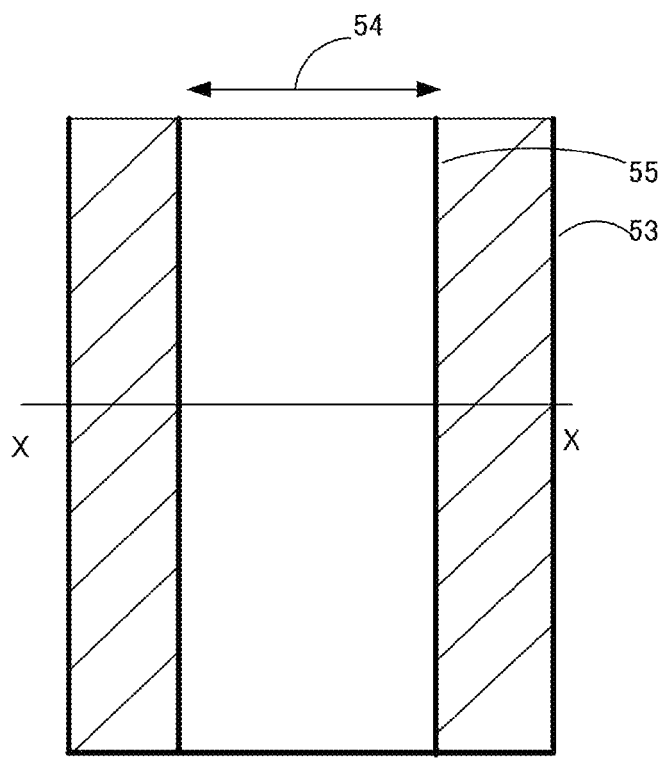
Figure 16:
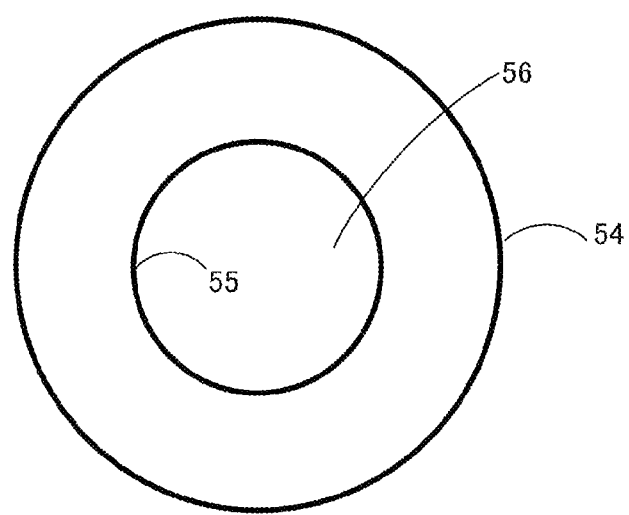
Figure 17:
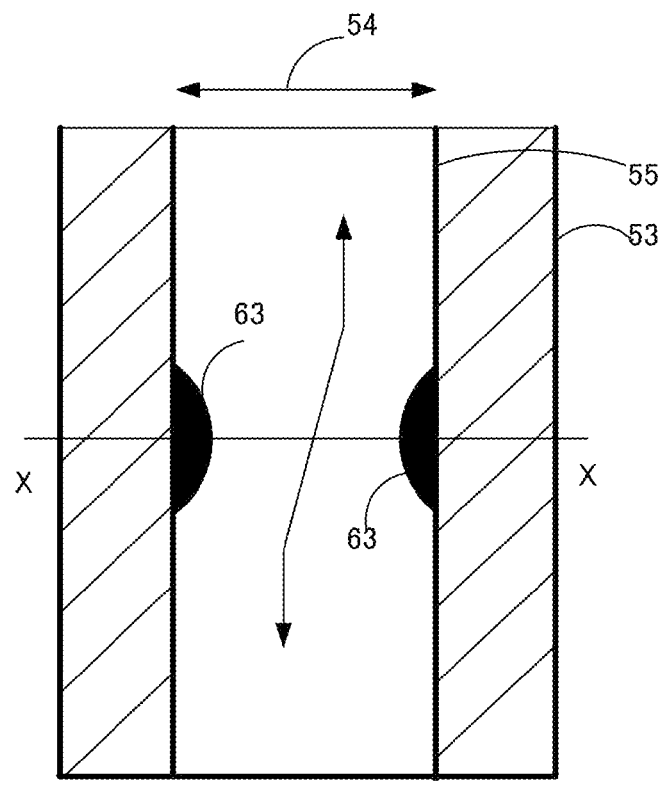
Figure 17:
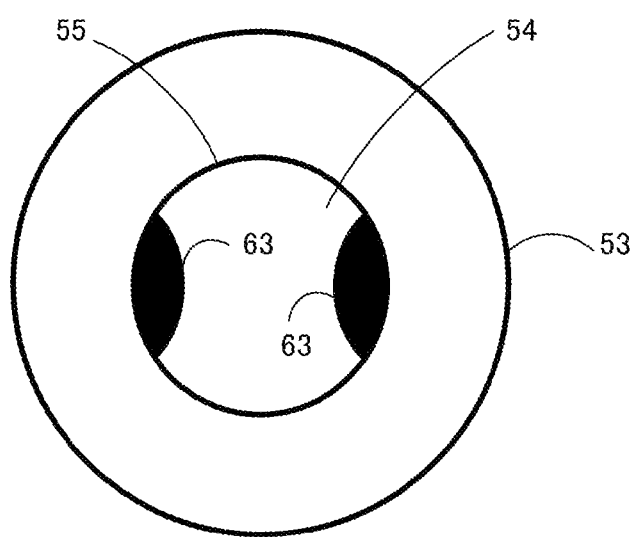
Figure 18:
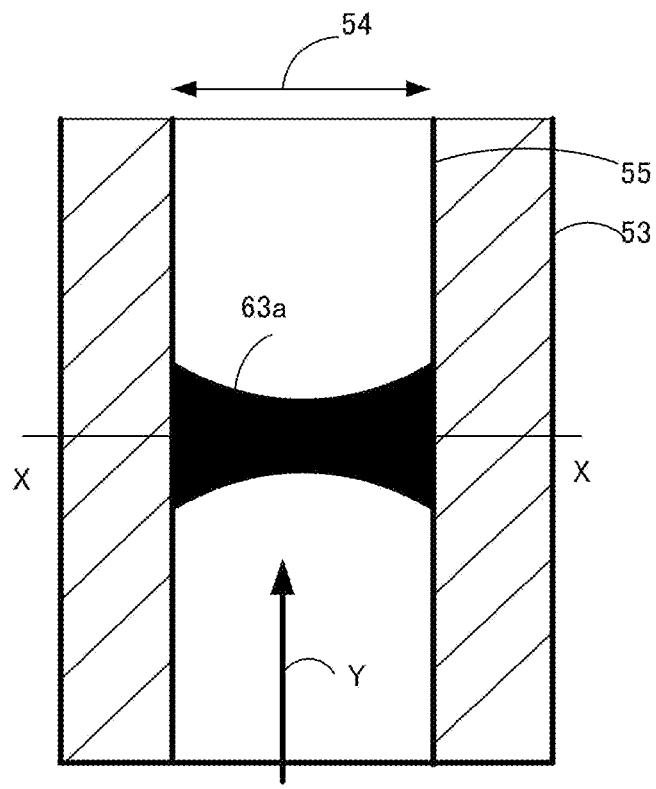
Figure 18:
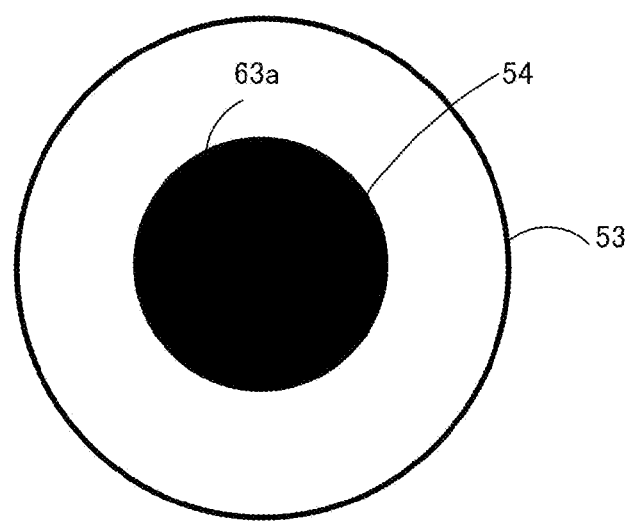

FIGS. 14A and 14B are main portion configuration diagrams of a pressure sensor package of a third embodiment of the invention, wherein FIG. 14A is a main portion side sectional view, and FIG. 14B is a main portion plan view cut along an X-X line of FIG. 14A.

The difference from FIGS. 1A to 1D is in the point that the groove 6 is formed in a ring form in a direction perpendicular to the longitudinal direction of the pressure inlet pipe 3. In the case of FIGS. 14A and 14B too, there is the same advantage as in FIGS. 1A to 1D. However, the advantage of the grown droplet 13 being evacuated from the entrance 4a of the hole 4 of the pressure inlet pipe 3 by gravity is smaller than in the cases of FIGS. 1A to 1D and FIGS. 2A and 2B. In this case, a molding die wherein the lower molding die 31 shown in FIG. 7A is separated left and right at the location of the groove 33 is used as the molding die for forming the case.

Also, the grooves 6 of Embodiment 1 to Embodiment 3 may be combined. Basically, provided that the groove 6 is formed in the wall surface 5 of the hole 4 of the pressure inlet pipe 3, making the wall surface 5 irregular, integration of the droplet 13 that grows due to surface tension advances over a wide range, and it is possible to prevent the hole 4 being blocked by the droplet 13.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments can be combined, as would be understood by one of skill in the art.

This application is based on, and claims priority to, Japanese Patent Application No. 2010-216968, filed on Sep. 28, 2010. The disclosure of the priority application, in its entirety, including the drawings, claims, and the specification thereof, is incorporated herein by reference.

What is claimed is:

1. A pressure sensor package, comprising:
   a case for housing a pressure sensor chip;
   a cover disposed on the case; and
   a pressure inlet pipe for transmitting the pressure of a pressure medium to the pressure sensor chip, wherein
   a groove is provided in an inner wall surface of a hole of the pressure inlet pipe.

2. The pressure sensor package according to claim 1, wherein
   the groove is provided from an entrance of the pressure inlet pipe from which the pressure medium is introduced to a location in which it reaches the vicinity of the pressure sensor chip.

3. The pressure sensor package according to claim 1, wherein
   the groove is provided parallel to the longitudinal direction of the pressure inlet pipe.

4. The pressure sensor package according to claim 1, wherein
   the sectional form of the groove is a U-shaped type.

5. A pressure sensor, wherein
   the pressure sensor chip is housed in the pressure sensor package according to claim 1.

* * * * *